Dec. 31, 1957  J. A. MAIN ET AL  2,818,303
WHEEL
Filed Jan. 6, 1956  4 Sheets-Sheet 1

INVENTOR.
JOHN A. MAIN.
CHARLES W. SINCLAIR.
BY

Dec. 31, 1957 J. A. MAIN ET AL 2,818,303
WHEEL
Filed Jan. 6, 1956 4 Sheets-Sheet 2

INVENTOR.
JOHN A. MAIN.
CHARLES W. SINCLAIR.
BY

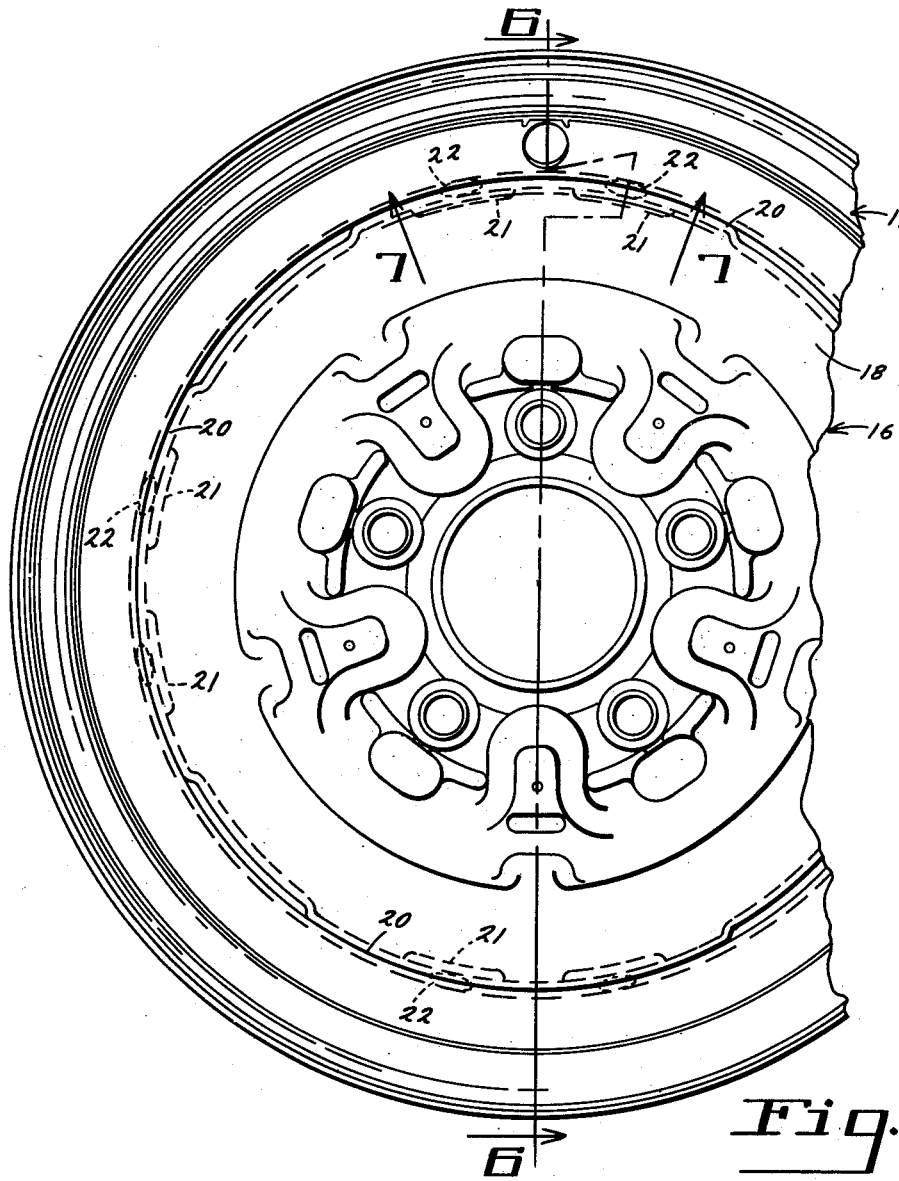

2,818,303
WHEEL

John A. Main, Birmingham, and Charles W. Sinclair, Detroit, Mich., assignors to Kelsey-Hayes Company, a corporation of Delaware Application January 6, 1956, Serial No. 557,667

4 Claims. (Cl. 301—63)

The invention relates to wheels and refers more particularly to vehicle wheels of that type in which the wheel bodies and tire rims are spot welded to each other.

The invention has for one of its objects to so construct a spot welded wheel that bending stress upon the spot welds is reduced to help eliminate fracture of the wheel body and tire rim at the spot welds.

The invention has for another object to form the wheel body with grooves near the spot welds and having a depth less than the thickness of that portion of the wheel body having the grooves to increase the flexibility of the wheel body and decrease the bending stress upon the spot welds.

These and other objects of the invention will become apparent from the following description taken in connection with the accompanying drawings in which—

Figure 3 is a peripheral view of a portion of the body of the wheel;

Figure 5 is a view similar to Figure 1 showing a modified construction of wheel;

Figure 1:
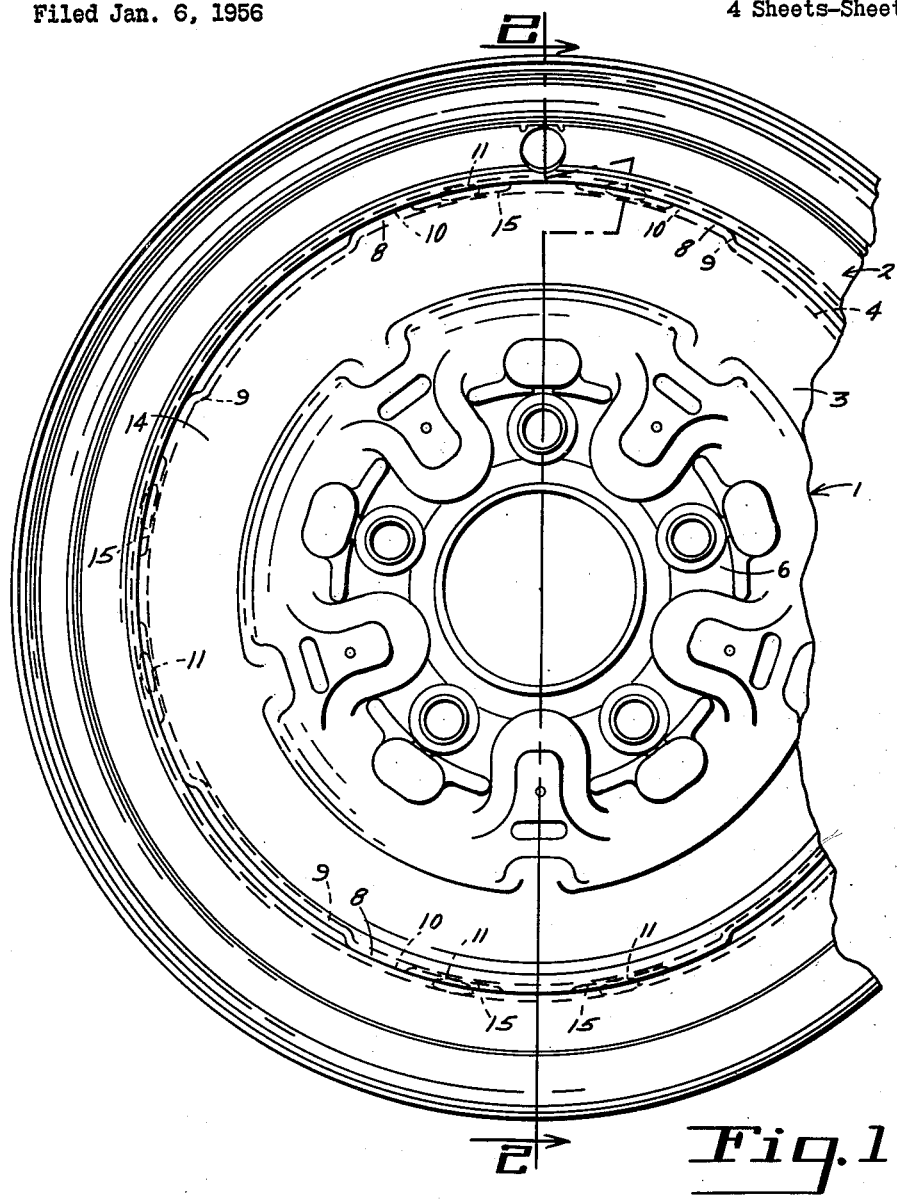
Figure 1 is an outboard elevation of a portion of a vehicle wheel embodying the invention.
Figures 2, 6:
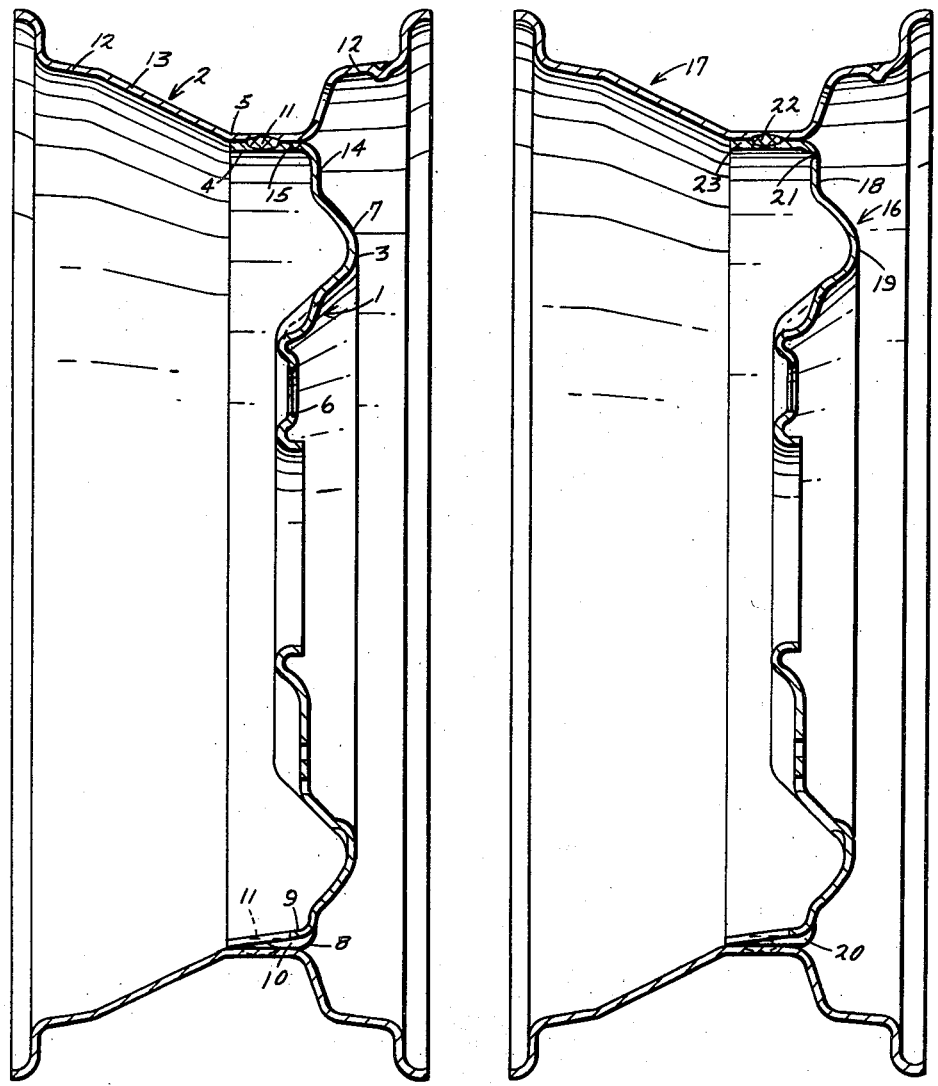
Figure 2 is a cross section on the line 2—2 of Figure 1.
Figure 9:
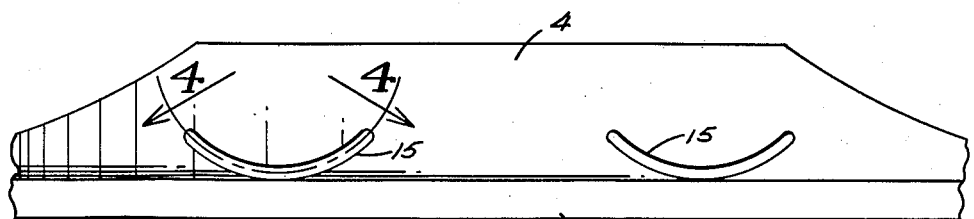
Figure 7:
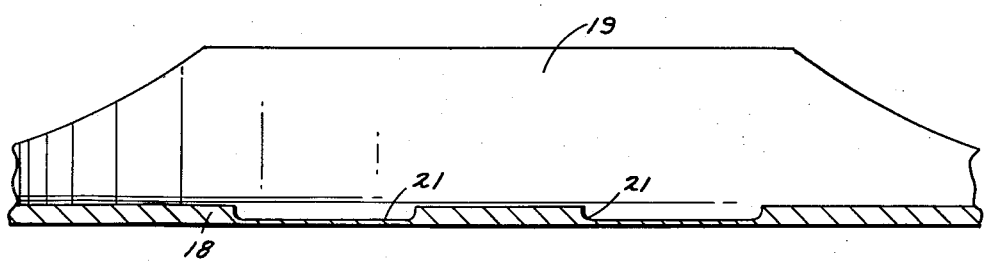
Figure 4:
Figure 4 is a cross section on the line 4—4 of Figure 3.

Figures 6 and 7 are cross sections on the lines 6—6 and 7—7 respectively of Figure 5.

The vehicle wheel is of the type in which the wheel body and tire rim are spot welded to each other. As shown, the wheel comprises the wheel body 1 and the tire rim 2, the wheel body being formed from a blank of uniform gauge and having the web 3 and the transverse flange 4 at the periphery of the web and the rim being of the drop-center type having the bottom 5 of its well encircling and spot welded to the transverse flange 4.

The web 3 of the wheel body has the central bolting-on flange 6 for detachably securing the wheel body to a wheel hub. The web also has the crown 7 and the spokes 8. The transverse flange is endless and has the portions 9 between and forming the edges of the spokes 8 and the portions 10 at the radially outer ends of the spokes and of greater axial extent or length than the portions 9. The tire rim is spot welded to the flange portions 10 in angularly spaced regions near the free ends of the flange portions by the spot welds 11, each of which is elliptic and elongated circumferentially of the wheel.

By reason of the tire bead seats 12 of the tire rim being axially offset with respect to the spot welds 11, the spot welds are ordinarily subject during use of the wheel to bending stress tending to separate the well bottom 5 and the flange portions 10 at the spot welds and to fracture the spot welds. For the purpose of reducing the bending stress so that the spot welds are substantially free of bending stress and do not fracture, the web 3 and the transverse flange 4, and more particularly the flange portions 10, are formed to locate the spot welds 11 as near as practicable to the center line of the rim without changing the rim and are also formed so that the well bottom 5 and the flange portions 10 at the spot welds move substantially together. As shown, the flange portions 10 terminate at substantially the junction of the well bottom 5 with the inboard side wall 13 of the well to make it possible to locate the spot welds as near as practicable to the axially inner edge of the well bottom. Furthermore, the radially outer portion 14 of the web 3 which includes the bodies of the spokes 8 and connects the crown portion 7 to the transverse flange 4 is formed to extend radially and to connect into the flange portions 10 near the axially outer edge of the well bottom 5 so that these flange portions are increased in axial extent or length in an axially outer direction.

Also, the wheel body 1 and particularly the transverse flange 4 is formed to control the direction of transmission of the bending stress to the spot welds by forming the flange portions 10 with the grooves 15. These grooves open radially outwardly and are located between the spot welds 11 and the radial portion 14 and are encircled by the bottom 5 of the well so that they are completely concealed from the outboard side of the wheel. The grooves are formed by being coined and have a depth less than the thickness of the flange portions or extend for a part only of the thickness of the metal forming the flange portions and the radial inner surface of the flange portions is continuous. The grooves extend generally circumferentially of the flange portions and are arcuate and the radius of the grooves is such that the grooves are substantially uniformly spaced from the spot welds. Moreover, the grooves are longer than the spot welds so that the ends of the grooves extend circumferentially beyond the ends of the spot welds.

As a result of the above construction the flexibility of the web and also of the flange portions is increased, the direction of transmission of bending stress to the spot welds is controlled and the bending stress upon the spot welds is reduced and as a result the flange portions and well bottom at the spot welds substantially move together and fracture of the spot welds is eliminated.

In the modification illustrated in Figures 5, 6 and 7 the construction of wheel body 16 and tire rim 17 is essentially the same as that of Figures 1, 2, 3 and 4 with the exception that the radially outer portion 18 of the web 19 and more particularly the spokes 20 are formed with the grooves 21 positioned axially outwardly from the welds 22 and having a depth less than the thickness of the radial portion 18. These grooves are coined and open axially inwardly and merge into the transverse flange portions 23 in which the welds are located. The grooves are of greater circumferential length than the welds and serve to increase the flexibility of the wheel at the junctions of the radial portion 18 and flange portions 23 and reduce the bending stress upon the spot welds.

What we claim as our invention is:

1. A wheel comprising a wheel body having a web provided with angularly spaced spoke portions and transverse flange portions at the radially outer ends of said spoke portions, and a tire rim spot welded to said flange portions in angularly spaced regions, said wheel body being formed with coined grooves near and in general angular alignment with the spot weld regions, said grooves extending for a part only of the thickness of the material of the wheel body and increasing the flexibility of said flange portions near the spot weld regions and reducing the bending stress upon the spot welds.

2. A wheel comprising a wheel body and a tire rim spot welded in angularly spaced regions to said wheel body, said wheel body being formed with grooves extending for a part only of the thickness of the material of the wheel body, the grooves being near and in general angular alignment with the spot weld regions, said grooves increasing the flexibility of the wheel body and decreasing the bending stress tending to fracture said wheel body and rim at the spot weld regions.

portions at the radially outer ends of said
s, and a tire rim spot welded to said flange
spoke portions being formed with coined
eneral angular alignment with said spoke
grooves having a depth less than the thick-
spoke portions and increasing the flexibility
and flange portions.

ences Cited in the file of this patent

UNITED STATES PATENTS

Schwennker _____ Oct. 25, 1932
Fergueson _____ Jan. 5, 1937